United States Patent
Unger

(10) Patent No.: US 7,522,586 B2
(45) Date of Patent: Apr. 21, 2009

(54) METHOD AND SYSTEM FOR TUNNELING WIDEBAND TELEPHONY THROUGH THE PSTN

(75) Inventor: Kenneth J Unger, Surrey (CA)

(73) Assignee: Broadcom Corporation, Irvine, CA (US)

( * ) Notice: Subject to any disclaimer, the term of this patent is extended or adjusted under 35 U.S.C. 154(b) by 1124 days.

(21) Appl. No.: 10/300,897

(22) Filed: Nov. 21, 2002

(65) Prior Publication Data

US 2003/0219009 A1 Nov. 27, 2003

Related U.S. Application Data

(60) Provisional application No. 60/382,086, filed on May 22, 2002.

(51) Int. Cl.
*H04L 12/28* (2006.01)

(52) U.S. Cl. .................................... 370/356; 370/352

(58) Field of Classification Search ......... 370/351–357, 370/401, 466, 521, 202, 435, 442, 468, 477, 370/328; 379/93.08, 188.1, 68, 7, 35; 375/240, 375/240.25, 241, 242, 222; 704/212, 500, 704/503; 707/101; 710/68
See application file for complete search history.

(56) References Cited

U.S. PATENT DOCUMENTS

| | | | | |
|---|---|---|---|---|
| 5,742,930 A * | 4/1998 | Howitt | .................. | 704/502 |
| 5,768,308 A | 6/1998 | Pon et al. | | |
| 5,793,810 A | 8/1998 | Han et al. | | |
| 5,892,811 A * | 4/1999 | Armbruster et al. | ............. | 379/7 |
| 6,172,974 B1 * | 1/2001 | Tseng et al. | ................. | 370/357 |
| 6,507,820 B1 * | 1/2003 | Deutgen | ...................... | 704/500 |
| 6,615,169 B1 * | 9/2003 | Ojala et al. | .................. | 704/205 |
| 6,693,900 B1 * | 2/2004 | Kaaresoja et al. | ........... | 370/356 |
| 6,904,094 B1 * | 6/2005 | Liu et al. | ................ | 375/240.13 |
| 7,023,819 B2 * | 4/2006 | Falsafi | ........................ | 370/328 |
| 7,130,280 B2 * | 10/2006 | Mahajan | ..................... | 370/261 |
| 7,181,209 B2 * | 2/2007 | Tamura | .................... | 455/432.1 |
| 2001/0038686 A1 | 11/2001 | Hinderks | | |
| 2002/0054571 A1 * | 5/2002 | Falsafi | ........................ | 370/252 |
| 2007/0123197 A1 * | 5/2007 | Tamura | ...................... | 455/403 |
| 2007/0127357 A1 * | 6/2007 | Tamura | ...................... | 370/202 |

FOREIGN PATENT DOCUMENTS

| EP | 1 061 753 | 12/2000 |
|---|---|---|
| EP | 1 069 738 | 1/2001 |

OTHER PUBLICATIONS

European Search Report Issued in Application No. 03011332.8 on Aug. 14, 2003, (3 pages).

* cited by examiner

*Primary Examiner*—Edan Orgad
*Assistant Examiner*—Chuong T Ho
(74) *Attorney, Agent, or Firm*—Sterne, Kessler, Goldstein & Fox P.L.L.C.

(57) ABSTRACT

A system for tunneling wideband telephony, comprises a communication device configured to produce a compressed wideband audio signal. The compressed wideband audio signal has (i) an audio frequency passband greater than that of an 8 kHz sampled audio signal, and (ii) a compressed data rate that is less than or equal to 64 kbps. The system also includes an apparatus, such as a voice gateway, coupled to the communication device and a data link, including a transcoder bypass configured to convert, without transcoding, the compressed wideband audio signal into a data stream including wideband compressed audio data for transmission over the data link.

16 Claims, 5 Drawing Sheets

METHOD AND SYSTEM FOR TUNNELING WIDEBAND TELEPHONY THROUGH THE PSTN

CROSS-REFERENCE TO RELATED APPLICATIONS

This application claims priority to U.S. Provisional Application No. 60/382,086, filed May 22, 2002, entitled "Method and System for Tunneling Wideband Telephony Through the PSTN," incorporated herein by reference in its entirety.

BACKGROUND OF THE INVENTION

1. Field of the Invention

The present invention relates generally to telephony systems.

2. Related Art

Improved voice quality, using wideband speech compression is gaining increasing importance in Internet Protocol (IP) telephony, especially in IP telephones, where this differentiates from traditional analog or digital narrowband phones. Wideband speech compression, where "wideband" represents audio signals sampled at greater than 8 kHz sampling rates, for example, can be characterized as "better than toll quality voice," or "better voice quality than the Public Switched Telephone Network (PSTN)."

Within a pure IP environment, wideband compressed speech can be carried directly between the two endpoints, for example, between two IP telephones engaged in a voice call. In many situations, however, calls are routed through the traditional PSTN use narrowband data links intended for carrying narrowband telephony. Such routing requires a conversion of the compressed wideband speech to a narrowband format, such as ITU-T Recommendation G.711 μ-law or A-law coded Pulse Code Modulation (PCM) at 64 kilo-bits per second (kbps), which corresponds to speech sampled at 8 kilo-Hertz (kHz) (that is, 8,000 samples per second), and digitized to 8-bits per sample. A data link operating according to such parameters is an example of a narrowband data link. The process of converting to the narrowband format typically includes a process referred to as "transcoding." The improved quality of wideband speech is lost in this process.

In situations where a caller at one endpoint uses a traditional narrowband telephone, there is little or nothing that can be done because the narrowband telephone frequency band-limits speech signals. However, there are a number of situations (and potentially an increasing number) where callers at both endpoints use IP telephones capable of supporting wideband telephony, and yet the call is still routed through the PSTN. Examples of this include cases where the IP telephony infrastructure is immature (e.g., the billing infrastructure is immature, etc.), and thus the existing PSTN infrastructure (e.g., a Class 5 switch) is used to provide these important services. Other reasons may be that the two endpoints are under the control of different service providers, or managed by different call management domains. Regardless of the reason, the result is the same: The improved voice quality of wideband voice compression is disadvantageously lost due to transmission over narrowband data links.

SUMMARY OF THE INVENTION

The present invention overcomes the above-mentioned and other disadvantages. According to a system embodiment of the present invention, a wideband audio signal is transferred between two communication devices, such as IP telephones or the like, over a PSTN or a PSTN-like data link, without diminishing the wideband characteristics of the wideband audio signal. In other words, the wideband audio signal is transferred through the PSTN, or over the PSTN-like data link, without a loss in wideband voice quality. The first communication device includes an encoder for compressing the wideband audio signal into a compressed wideband audio signal. The first communication device transmits the compressed wideband audio signal to a first voice gateway. The first voice gateway is coupled to a second voice gateway over the PSTN or PSTN-like data link. The data link between the voice gateways is normally used for carrying a narrowband audio signal.

Each of the voice gateways operates in a transcoder bypass configuration, so as to avoid converting wideband compressed audio signals received thereat into a narrowband audio format usually carried by the data link between the two voice gateways. This establishes a tandem link between the two voice gateways. The first voice gateway transmits the compressed wideband audio signal to the second voice gateway using this tandem link. This preserves the wideband characteristics of the wideband audio signal as it is transmitted between the voice gateways. The second voice gateway forwards the received wideband compressed audio signal to the second communication device. The second communication device includes a decoder for decompressing the received compressed wideband audio signal into a wideband audio signal representative of that which was initially encoded at the first communication device. Thus "better than PSTN" voice quality may be achieved, even though the voice call goes through the PSTN, or over a PSTN-like data link.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

As used herein, the terms "speech," "audio" and "voice" are used equivalently and interchangeably. For example, a speech signal, an audio signal, and a voice signal may all refer to the same signal.

Figure 1:
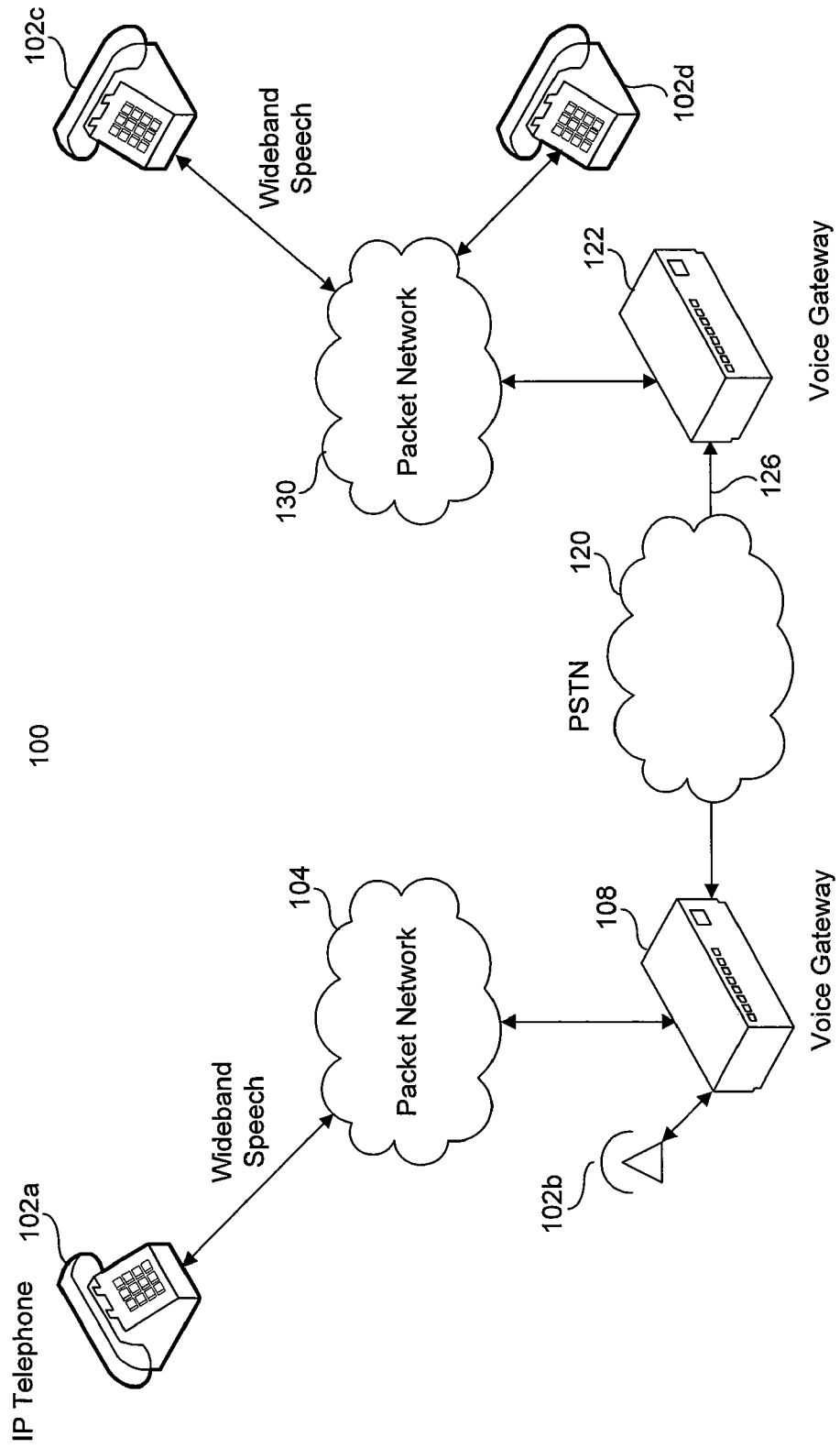
FIG. 1 is an illustration of an example system for tunneling wideband telephony through the PSTN.

FIG. 1 is an illustration of an example system 100 for tunneling wideband telephony through the PSTN or through PSTN-like data links. System 100 includes various embodiments of the present invention. System 100 includes one or more representative communication devices (CDs) 102a-102d each capable of supporting wideband telephony. CDs 102 may be full IP telephones, or may include only portions thereof. Other examples of a communication device include, but are not limited to, a voice enabled Personal Digital Assistant (PDA), or a computer coupled with an audio headset in a known manner. Also, CDs 102 may be wireless communication devices or wired communication devices. Communication device (CD) 102a exchanges communication signals with a packet network (PN) 104, either wirelessly or over wires.

Packet network 104 exchanges communication signals with a first voice gateway (VG) 108. CD 102b exchanges communication signals with VG 108 directly. Thus, CD 102a is coupled to VG 108 through packet network 104, while CD 102b is coupled to VG 108 directly. VG 108 may be a local Private Branch Exchange (PBX). The communication signals referred to above and below are representative of wideband audio signals. For example, the communication signals include compressed wideband audio signals.

VG 108 and a second VG 122 are both coupled to the PSTN 120. System 100 tunnels wideband telephony between voice gateways 108 and 122 through PSTN 120, over one or more narrowband PSTN data links 126, as will be described in further detail below. Voice gateway 122 exchanges communication signals with a packet network 130. Packet network 130 exchanges communication signals with CDs 102c and 102d. Networks 104, 120 and 130 may be part of or include the Internet. System 100 supports an exchange of compressed wideband audio packets between communication devices, such as between communication devices 102a or 102b and 102c and 102d, using the above-mentioned wideband tunneling between VGs 108 and 122, and thus, through PSTN 120 in the depicted embodiment.

"Tunneling" as used herein generally means, but is not limited to, transferring a wideband audio signal (e.g., a compressed wideband audio signal) over a data link, while preserving the wideband frequency characteristics of the wideband audio signal (e.g., a wideband audio frequency passband of the wideband audio signal represented by the compressed wideband audio signal). The data link over which the wideband audio signal is transferred or carried is typically one intended for a narrowband audio signal, that is, an audio signal having an audio frequency passband that is less than that of the wideband audio signal. In other arrangements of the present invention, PSTN 120 may be replaced with a data link, such as a dedicated data link not linked to the PSTN. In other words, the data link between VGs 108 and 122 need not actually be part of the PSTN, but should be capable of operating as described in the manner described below.

Figure 2:
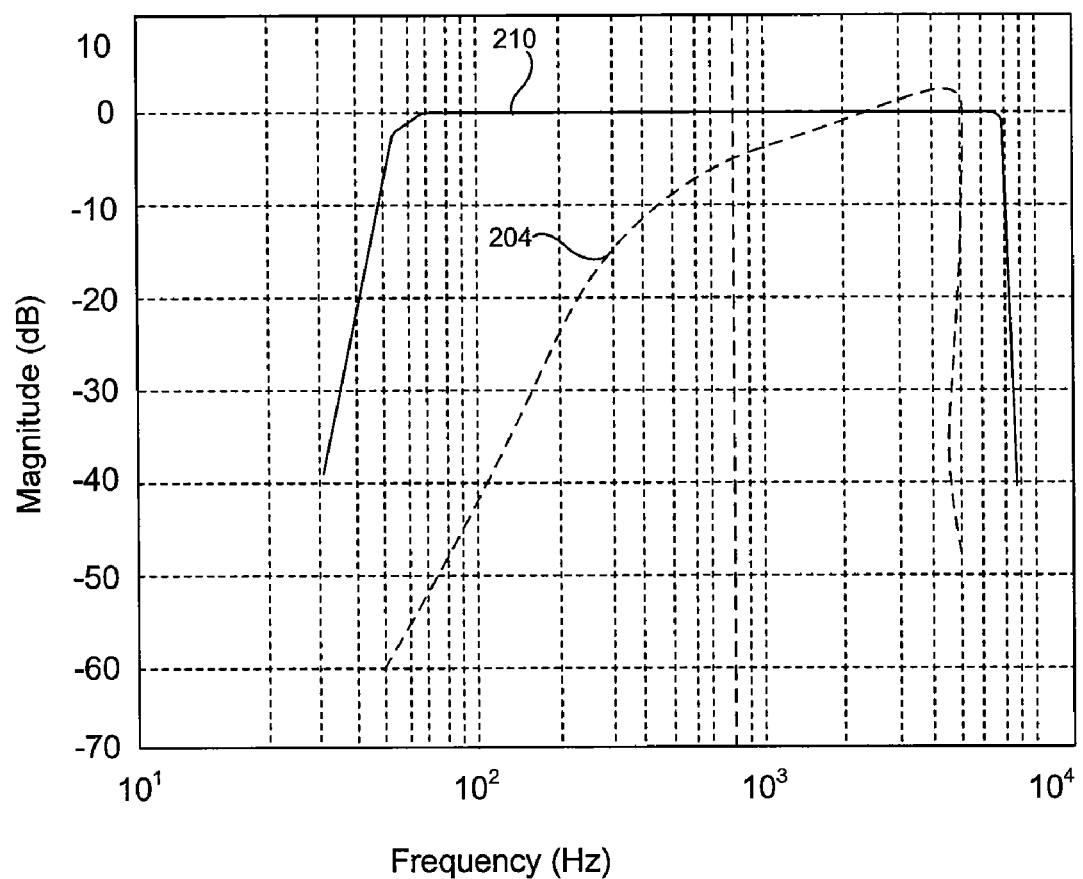
FIG. 2 is a graphical illustration of some of the spectral differences between narrowband telephone speech and wideband speech.

FIG. 2 is a graphical illustration of some of the differences between narrowband telephone speech and wideband speech. In conventional narrowband telephony, typically, a speech signal is bandpass filtered using an Intermediate Reference System (IRS) frequency weighting or mask, prior to digitization of the speech signal at 8 kHz. In FIG. 2, a dashed-line plot 204 represents the IRS mask for conventional telephone-bandwidth speech, taken directly from a transit mask of the ITU-T Recommendation P.48. The IRS mask has a narrowband audio frequency passband of approximately 300 to 3400 Hz. Thus, applying the IRS mask results in a typical audio frequency passband following the mask for narrowband speech. Even if the mask is not applied, digitizing the speech at 8 kHz limits the Nyquist bandwidth of the digitized speech to 4 kHz.

In contrast, a solid-line plot 210 represents an example frequency response of wideband speech having a frequency passband from approximately 50-7,000 Hz. To achieve wideband speech, the IRS frequency weighting described above is not used, and the speech is digitized using a sample rate of greater than 8 kHz, for example, 16 kHz.

Figure 3A:
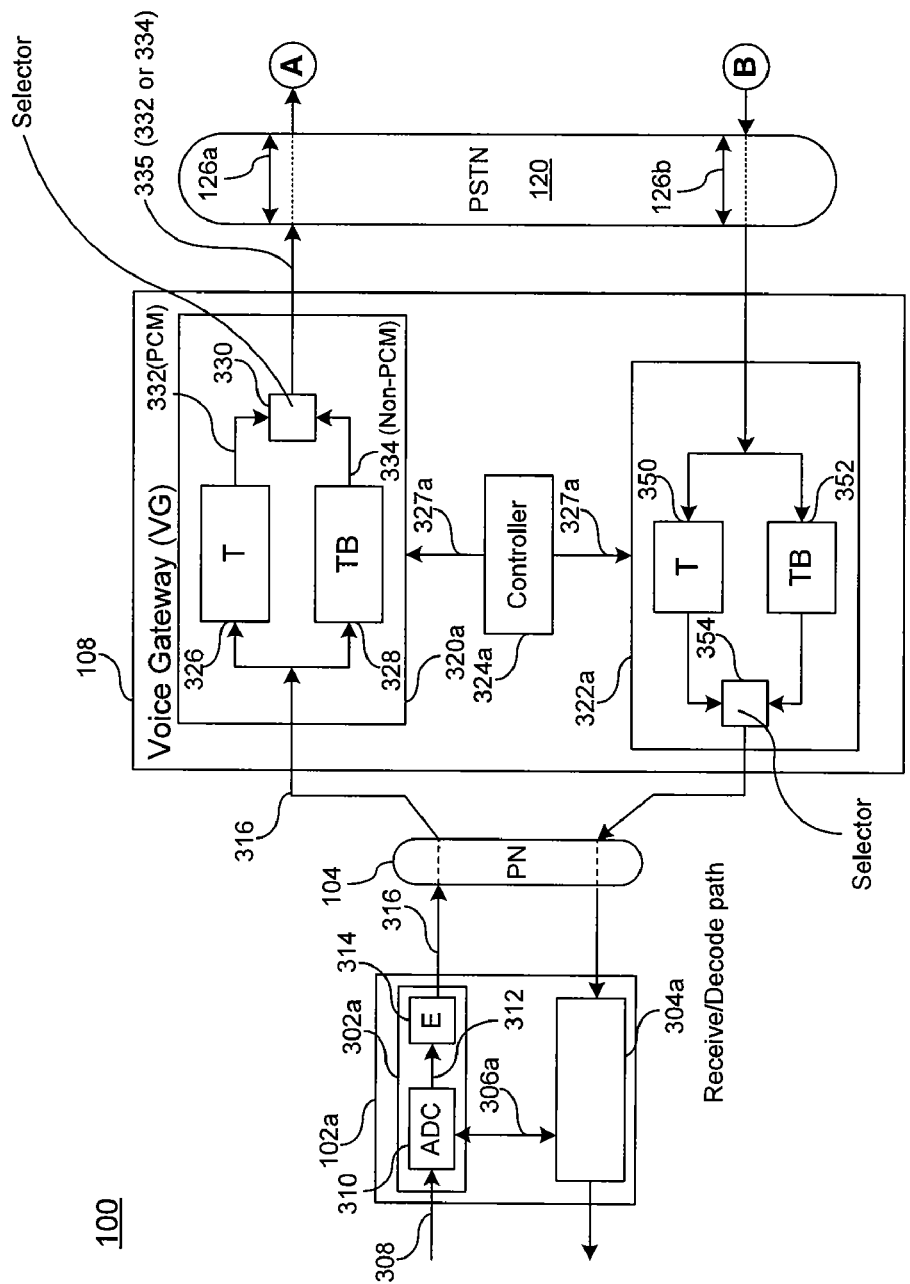
FIGS. 3A and 3B are connected block diagrams expanding on the various elements of the system of FIG. 1.
Figure 3B:
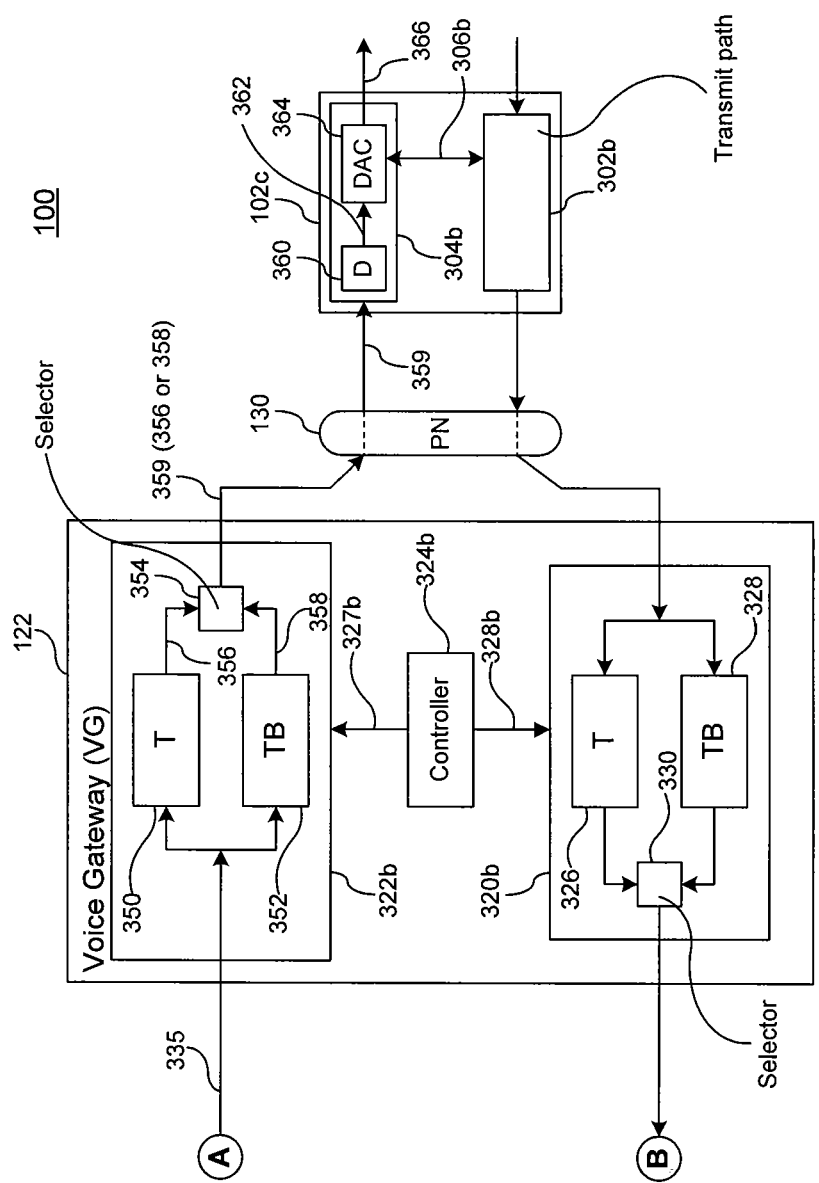

FIGS. 3A and 3B are connected block diagrams expanding on the various elements of system 100. Specifically, example arrangements of CDs 102a and 102c, and VGs 108 and 122, are depicted in FIGS. 3A and 3B. Other arrangements of these elements other than those depicted are contemplated, as would be apparent to one having ordinary skill in the relevant art(s) given the present description. In the ensuing description of FIGS. 3A and 3B, it is assumed an end-to-end communication link or call has been established between endpoint CDs 102a and 102c. This call configuration is representative of other call configurations between different CDs 102, for example, between CDs 102b and 102d, or between CDs 102b and 102a. The end-to-end communication link depicted in FIGS. 3A and 3B may or may not support wideband tunneling, depending on whether VGs 108 and 122 are configured to support such operation, as will be described in further detail below.

It is also assumed that communication signal flow in a forward direction from CD 102a to CD 102c is substantially the same as communication signal flow in a reverse direction from CD 102c to 102a. Thus, the ensuing description of communication signal flow in the forward direction shall also suffice for communication signal flow in the reverse direction. Each of the elements of system 100 described below have full-duplex communication capability. In alternative arrangements, one or more of these elements may have half-duplex capability only.

Referring to FIG. 3A, CD 102a includes a transmit or encode path 302a and a receive or decode path 304a. A sample clock 306a is provided to each of paths 302a and 304a. Transmit path 302a receives an audio signal 308 from a user of CD 102a, for example. An analog-to-digital converter (ADC) 310 samples audio signal 308 in accordance with sample clock 306a, to produce a sampled wideband audio signal 312. For example, ADC 310 samples audio signal 308 at a sample rate greater than 8 kHz (e.g., at 16 kHz), whereby sampled wideband audio signal 312 has a Nyquist bandwidth or frequency passband greater than 4 kHz (e.g., a Nyquist bandwidth of 8 kHz).

An encoder (E) or signal compressor 314 encodes sampled wideband audio signal 312 into a compressed wideband audio signal 316, while preserving the wideband passband of audio signal 312. In an embodiment, encoder 314 produces wideband audio signal 316 at a compressed data rate of less than or equal to 64 kbps, such as 32 kbps. In this embodiment, wideband audio signal 316 represents an audio signal having a sample rate greater than 8 kHz (e.g., 16 kHz), and a compressed data rate of less than or equal to 64 kbps (e.g., 32 kbps). Compressed wideband audio signal 316 is typically a packetized signal including a stream of compressed wideband audio data packets. Each data packet may include: a header field containing packet header information; a payload field including data bits representing the wideband audio signal in compressed form; and a trailer field including trailer information, such as a Cyclic Redundancy Check (CRC) field or other error correction fields, for example.

CD 102a produces compressed wideband audio signal 316, and transmits this signal to VG 108, through PN 104. VG 108 receives signal 316 from PN 104. VG 108 includes a transmit path 320a, a receive path 322a, and a controller 324a for controlling the receive and transmit paths over a control interface 327a. Transmit path 320a transmits communication signals to PSTN 120 while receive path 322a receives communication signals from PSTN 120. It is to be understood that apparatuses 320a, 322a and 324a represent portions (or collectively, a portion) of VG 108 by way of example only, and that VG 108 may include many other elements not important to the present invention, and therefore, not included in the present description. Also, it is envisioned that apparatuses 320a, 322a and 324 may be used individually or together in other applications, such as in combined data and voice gateways or communication hubs, for example.

Transmit path 320a includes a transcoder (T) 326 for transcoding signals, and a transcoder bypass (TB) 328 for bypassing transcoder 326. Transcoder 326 and transcoder bypass 328 have their respective outputs coupled to a selector 330 for selectively coupling the output of transcoder 326 or the output of transcoder bypass 328 to a data link 126a of PSTN 120. Instead of selector 330, a combiner, such as an adder, may be used to combine signals produced by transcoder 326 and transcoder bypass 328.

Controller 324a can configure transmit path 320a to operate in a first configuration, also referred to as a transcoder configuration, wherein transcoder 326 transcodes a received signal, such as signal 316, into a transcoded PCM voice data stream 332. In other words, controller 324a enables transcoder 326. A typical transcoder includes a decoder and/or rate-converter followed by either a μ-law or an A-law converter for generating μ-law or A-law coded PCM voice samples, as would be apparent to one having ordinary skill in the relevant art(s). Thus, an example of transcoded audio signal 332 is a μ-law or A-law 64 kbps PCM data stream in accordance with ITU-T G.711 and suitable for transmission over a conventional PCM PSTN data link. In the first configuration, transmit path 320a passes transcoded PCM data stream 332 to data link 126a, for transmission of the data stream through the PSTN. Typically, data link 126a carries PCM samples of data stream 332 at a data rate of 64 kbps.

Controller 324a can configure transmit path 320a to operate in a second configuration, also referred to as a transcoder bypass configuration, wherein transcoder bypass 328 bypasses transcoder 326. In other words, controller 324a enables transcoder bypass 328. The second configuration is used for tunneling wideband telephony through the PSTN. In the second configuration, transcoder bypass 328 converts compressed wideband audio signal 316, without transcoding signal 316, into a data stream 334 including the wideband compressed audio. Data stream 334 is also referred to herein as wideband compressed audio data stream 334. Transcoder bypass 328 transmits non-transcoded data stream 334 to and through PSTN 120 over data link 126a. In the second configuration, data packets included in compressed wideband audio signal 316 bypass transcoder 326, and are thus passed to data link 126a. The data, such as digital information, included in such data packets replaces the μ-law or A-law coded PCM samples that would otherwise be carried by data link 126a when transmit path 320a is in the first configuration. Transcoder bypass 328 can provide the compressed wideband audio data in data stream 334 in any number of data transmission formats, including, a time division multiplex (TDM) data format or a packet data format, for example. In FIG. 3A, a signal 335 represents either transcoded signal 332 (e.g., PCM voice samples) or non-transcoded, compressed wideband audio signal 334, depending on whether transmit path 320a is in the first or second configuration, respectively.

Referring to FIG. 3B, VG 122 includes a transmit path 320b, a receive path 322b and a controller 324b. Elements having like reference numerals but different suffix descriptors "a" or "b" are substantially identical. Receive path 322b includes a transcoder 350, a transcoder bypass 352, and a selector 354 having first and second inputs coupled to respective outputs of transcoder 350 and transcoder bypass 352.

Controller 324b can configure receive path 322b to operate in a first configuration (also referred to as a transcoder configuration), wherein transcoder 350 transcodes a received signal, such as PCM data stream 335 (for example, PCM data stream 332) received from data link 126a, into a transcoded audio signal 356. Transcoder 350 performs reverse or complementary operations with respect to transcoder 326, as would be appreciated by one having ordinary skill in the relevant art(s). Thus, transcoder 350 may be considered a "reverse transcoder" with respect to transcoder 326 of transmit path 320a. In the first configuration, selector 354 transmits audio signal 356 to packet network 130.

Controller 324b can configure receive path 322b to operate in a second configuration (also referred to as a transcoder bypass configuration) used for tunneling wideband telephony through the PSTN. In the second configuration, transcoder bypass 352 bypasses transcoder 350. In other words, transcoder bypass 352 converts, without transcoding, data stream 335 (for example, compressed wideband audio data stream) into a compressed wideband audio signal 358. For example, transcoder bypass converts, without transcoding, data stream 335 back into a stream of compressed wideband audio packets, representative of the wideband audio packets of signal 316 discussed in connection with FIG. 3A. In the second configuration, selector 354 passes or transmits wideband compressed signal 358 to packet network 130. In FIG. 3B, a signal 359 represents either transcoded signal 356 or non-transcoded signal 358, depending on whether transmit path 322b is in the first or second configuration, respectively.

Packet network 130 delivers audio signal 359 (that is, either signal 356 or signal 358) to CD 102c. CD 102c includes a receive or decode path 304b and a transmit or encode path 302b. A sample clock 306b is provided to both paths 302b and 304b. Receive path 304b receives audio signal 359 (assumed to be wideband compressed audio signal 358 for the ensuing description). A decoder 360 decodes signal 359 into a decoded or decompressed wideband audio signal 362 representative of sampled wideband audio signal 312 discussed in connection with originating CD 102a. A digital-to-analog converter (DAC) 364 converts decoded wideband audio signal 362 into a wideband audio signal 366.

CDs 102 may each include a Broadcom (BCM) BCM1100 Voice Over IP 10/100Base-T CPE Engine, manufactured by Broadcom Corporation of California, USA. The BCM1100 Engine includes Broadcom's BroadVoice™ wideband voice coder (encoder/decoder, also referred to as coder/decoder). The encoder or coder portion of the BCM1100 Engine produces 16 kHz sampled (thus, wideband) compressed audio/speech at a compressed data rate of 32 kbps. The decoder portion of the BCM1100 Engine decodes or decompresses the compressed audio/speech. The BroadVoice™ coder is described in detail in copending U.S. Non-Provisional patent application Ser. No. 09/722,077, filed Nov. 27, 2000, entitled "Method and Apparatus for One-Stage and Two-Stage Noise Feedback Coding of Speech and Audio Signals," incorporated herein by reference in its entirety.

Other arrangements of the CDs are possible. For example, the CDs may produce compressed audio signals in accordance with the ITU-T Recommendation G.722 Wideband Speech Coding Standard.

Each of VGs 108 and 122 may include a BCM1510 Voice Calisto Platform VoP (Voice Over IP) Solution, manufactured by Broadcom Corporation of California, USA. The BCM1510 Solution may be configured in accordance with the description of VGs 108 and 122 provided herein. It is advantageous for the voice compression effected at CD 102a to be significantly less than 64 kbps. The lower the compressed data rate, the higher the available bandwidth for the transmission of overhead information (such as header and trailer packet information, including packet framing and CRC or other error checking information) over the narrowband data link (e.g., over data link 126a operating at 64 kbps). For example, the Broadcom BroadVoice™ wideband voice coder provides high quality voice with 16 kHz sampling and 32 kbps compression. Such compression leaves enough "free" bandwidth for packet data to be streamed through the narrowband link at a rate greater than a packetization interval of the packet data. In this example, the amount of free bandwidth=64 kbps−(32 kbps+overhead data rate, such as the data rate required to transmit header and trailer fields). This advantageously reduces an end-to-end delay because it eliminates or reduces the requirement for a jitter buffer at either of the voice gateways (for example, in VGs 108 and 122). The result is an increase in the speed at which data packets are streamed through the tandem link.

As described above, VGs 108 and 122 may each operate in (i) a transcoding configuration, or (ii) a transcoder bypass configuration for supporting wideband tunneling. In a typical call scenario, VGs 108 and 122 each transition between these two configurations in order to support wideband tunneling, as is now described. Initially, a call is established between endpoint CDs 102a and 102c. At this time, transmit path 320a of VG 108 and receive path 322b of VG 122 are each in their respective first or transcoder configurations. That is, transmit path 320a transcodes compressed wideband audio signal 316 into PCM data stream 332, and receive path 322b reverse transcodes the PCM data stream received from link 126a. Such transcoding destroys the wideband audio advantage offered by the compressed wideband audio signals, due to the band limiting effect of transcoding to and from G.711 formatted PCM samples, for example.

Next, VG 108 and VG 122 negotiate with one another to determine whether each of the VGs has the capability to support wideband tunneling, that is, to exchange compressed wideband audio signals using the transcoder bypass configurations described above. One way VGs 108 and 122 negotiate is through in-band signaling, as would be apparent to one having ordinary skill in the relevant art(s). To support wideband tunneling, in addition to having transcoder bypass capability, the transmit paths and the receive paths of VGs 108 and 122 need to be compatible with the encoder and decoder used in the CDs to which they are respectively coupled. For example: transmit path 320a (more specifically, transmit bypass 328) needs to be compatible with encoder 314 of CD 102a; and receive path 322b (more specifically, bypass 352) needs to be compatible with decoder 360 of CD 102c. This compatibility may also be determined through in-band signaling.

If it is determined, through the above-mentioned negotiation, that both VG 108 and VG 122 can support wideband tunneling, then the VGs are configured for such operation. For example, transmit path 320a of VG 108 is configured to operate in the transcoder bypass configuration, and corresponding receive path 322b of VG 122 is configured to operate in the transcoder bypass operation, whereby the VGs exchange compressed wideband audio signals without transcoding of the signals, in the manner described above. The process of negotiating between VGs 108 and 122, and of re-configuring the VGs for tunneling operation, may be controlled by controllers 324a and 324b.

Figure 4:
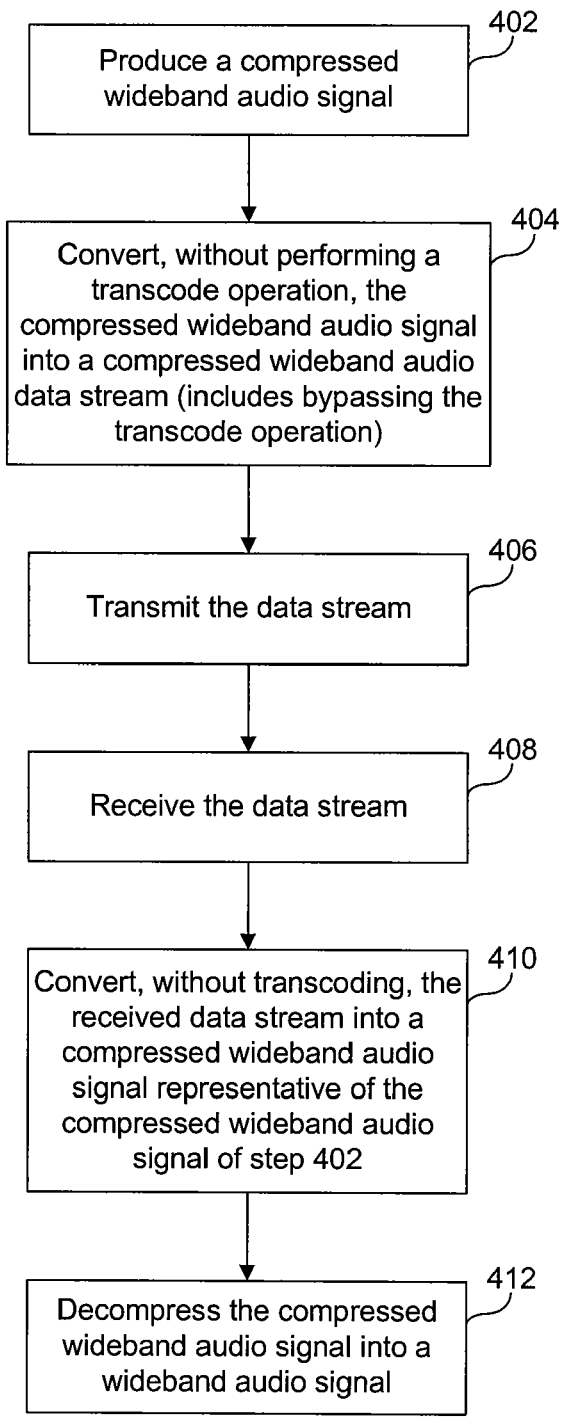
FIG. 4 is an example method of tunneling wideband telephony that may be implemented across various elements of the system of FIG. 1.

If it is determined that wideband tunneling can not be supported, then the VGs continue to transfer data packets using the narrowband links (e.g., links 126a and 126b carrying PCM formatted data streams). FIG. 4 is an example method 400 of tunneling wideband telephony that may be implemented across various elements of system 100. An initial step 402 includes producing a compressed wideband audio signal. The compressed wideband audio signal has a wideband audio passband. For example, CD 102a produces compressed wideband audio signal 316, and transmits the signal to VG 108.

A next step 404 includes converting, without performing a transcode operation, the compressed wideband audio signal into a compressed wideband audio data stream (that is, a data stream including compressed wideband audio data). This step includes bypassing the transcode operation so as to maintain the wideband audio passband. For example, transmit path 320a, operating in the transcode bypass configuration, converts compressed wideband audio signal 316 into the compressed wideband data stream, without transcoding signal 316.

A next step 406 includes transmitting the non-transcoded data stream. For example, transmit path 320a transmits data stream 334 over 64 kbps data link 126a.

A next step 408 includes receiving the data stream. For example, receive path 322b of VG 122 receives non-transcoded data stream 334.

A next step 410 includes converting, without transcoding, the received data stream into a compressed wideband audio signal representative of the compressed wideband audio signal of step 402. For example, receive path 322b converts, without transcoding, received data stream 334 into a compressed wideband audio signal 358/359 representative of compressed wideband audio signal 316. Received path 322b transmits signal 359 to CD 102c.

A next step 412 includes decoding or decompressing the compressed wideband audio signal into a decompressed wideband audio signal for delivery to a user, for examiner. For example, CD 102c produces wideband audio signal 366 from received signal 358 using a decode and digital-to-analog conversion operation. In method 400, the wideband passband of the wideband audio signal (e.g., of signal 312) is preserved or maintained at each step.

Method 400 includes or combines multiple independent methods performed separately by different elements of system 100. For example, steps 402 and 404 together represent a method performed by CD 102a and VG 108, together. Step 404 represents another method performed by VG 108. Steps 408 and 410 together represent another method performed by VG 122. Steps 404-410 together represent another method performed by VGs 108 and 122, together. Other methods would be apparent to one having ordinary skill in the relevant art(s) given the present description.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A system configured to tunnel a compressed wideband audio data stream through a data link intended for a narrowband audio data stream, comprising:
   a first apparatus, comprising
      a first transcoder configured to transcode a first compressed wideband audio signal into a narrowband audio data stream, and
      a first transcoder bypass configured to convert, without transcoding, the compressed wideband audio signal into a 64 kbps compressed wideband audio data stream for transmission over the data link, wherein the data link is configured to transmit the narrowband audio data stream at a data rate less than or equal to 64 kbps; and
   a second apparatus, comprising
      a second transcoder configured to transcode the narrowband audio data stream into a second compressed wideband audio signal, and
      a second transcoder bypass configured to convert, without transcoding, the 64 kbps compressed wideband audio data stream into the second compressed wideband audio signal wherein a sampling frequency greater than 8 kHz is used to produce a sampled wideband audio signal, which is subsequently encoded to produce the compressed wideband audio signal.

2. The system of claim 1, wherein, the first transcoder is configured to transcode the narrowband audio signal into a transcoded PCM data stream when the transcoder bypass is not configured to convert, without transcoding, the compressed wideband audio signal into the compressed wideband audio data stream.

3. The system of claim 1, further comprising:
   a controller for selectively enabling either the first transcoder bypass or the first transcoder.

4. The system of claim 1, wherein the first transcoder bypass is coupled to a PSTN data link, and is configured to transmit the compressed wideband audio data stream over the PSTN data link.

5. The system of claim 1, wherein the first apparatus is a portion of a voice gateway.

6. The system of claim 1, wherein the first compressed wideband audio data stream is one of a TDM data format and a packet data format.

7. A system for tunneling wideband telephony through a data link intended for a narrowband audio data stream, comprising:
   a communication device configured to produce a compressed wideband audio signal;
   a first apparatus, coupled to the communication device, including a first transcoder and a first transcoder bypass configured to convert, without transcoding, the compressed wideband audio signal into the compressed wideband audio data stream, wherein a sampling frequency greater than 8 kHz is used to produce a sampled wideband audio signal, which is subsequently encoded to produce the compressed wideband audio signal wherein the data link is configured to transmit a narrowband audio data stream at a data rate less than or equal to 64 kbps and is coupled to the first apparatus, and wherein the first apparatus is configured to transmit the compressed wideband audio data stream over the data link
   a second apparatus configured to receive the compressed wideband audio data stream from the data link, the second apparatus including a second transcoder bypass configured to convert, without transcoding, the received wideband audio data stream into a compressed wideband audio signal representative of the compressed wideband audio signal produced by the communication device.

8. The system of claim 7, wherein the first transcoder bypass in configured to convert, without transcoding, the compressed wideband audio signal into the compressed wideband audio data stream while maintaining an audio frequency passband of the compressed wideband audio signal.

9. The system of claim 7, wherein the first apparatus further includes a first transcoder for transcoding a narrowband audio signal into a transcoded PCM data stream when the first transcoder bypass is not configured to convert, without transcoding, the compressed wideband audio signal into the compressed wideband audio data stream.

10. The system of claim 7, wherein the compressed wideband audio data stream has a data rate equal to 64 kbps.

11. The system of claim 7, wherein the communication device includes an encoder configured to encode the sampled wideband audio signal into the compressed wideband audio signal.

12. The system of claim 10, wherein the communication device further includes an ADC configured to sample an analog wideband audio signal at the sampling frequency, to produce the sampled wideband audio signal.

13. The system of claim 11, further comprising a PSTN data link coupled to the first apparatus, wherein the first apparatus is configured to transmit the compressed wideband audio data stream over the data link at 64 kbps.

14. The system of claim 7, wherein the first apparatus is a portion of a voice gateway.

15. A system for tunneling wideband telephony through a PSTN data link, comprising:
   a first apparatus configured to receive a first compressed wideband audio signal, the first apparatus including a first transcoder and a first transcoder bypass configured to convert, without transcoding, the first compressed wideband audio signal into a compressed wideband audio data stream for transmission through the PSTN data link; and
   a second apparatus configured to receive the compressed wideband audio data stream from the PSTN data link, the second apparatus including a second transcoder and a second transcoder bypass configured to convert, without transcoding, the received compressed wideband audio data stream into a second compressed wideband audio signal representative of the first compressed wideband audio signal;
   wherein the data link is configured to transmit a narrowband audio data stream at a data rate less than or equal to 64 kbps; and
   wherein a sampling frequency greater than 8 kHz is used to produce a sampled wideband audio signal, which is subsequently encoded to produce the first compressed wideband audio signal.

16. The system of claim 15, wherein the first and second apparatuses are respective portions of first and second voice gateways.

* * * * *

UNITED STATES PATENT AND TRADEMARK OFFICE
CERTIFICATE OF CORRECTION

| | | |
|---|---|---|
| PATENT NO. | : 7,522,586 B2 | Page 1 of 1 |
| APPLICATION NO. | : 10/300897 | |
| DATED | : April 21, 2009 | |
| INVENTOR(S) | : Kenneth J. Unger | |

It is certified that error appears in the above-identified patent and that said Letters Patent is hereby corrected as shown below:

In column 10, line 4, "over the data link" should read as "over the data link; and"

In column 10, line 14, "bypass in configured" should read as "bypass is configured".

Signed and Sealed this

Twenty-second Day of September, 2009

David J. Kappos
*Director of the United States Patent and Trademark Office*